March 14, 1967 E. DAVILA 3,308,943
METHOD OF PACKAGING PURIFIED GRAPHITE
AND THE PACKAGE FORMED THEREBY
Filed Aug. 5, 1963

INVENTOR
Eugene Davila
Jesse M Roberts
Attorney

United States Patent Office 3,308,943
Patented Mar. 14, 1967

3,308,943
METHOD OF PACKAGING PURIFIED GRAPHITE
AND THE PACKAGE FORMED THEREBY
Eugene Davila, 1209 Meeker St.,
West Covina, Calif. 91790
Filed Aug. 5, 1963, Ser. No. 299,908
8 Claims. (Cl. 206—84)

This invention relates to a method of producing purified graphite articles in form for protection against contamination up to the time of use of the articles.

Since graphite is a form of carbon, the term "carbon" is to be understood as including graphite and the two terms may be used interchangeably. Graphite articles are prepared in various forms for various uses, including graphite crucibles, graphite articles for atomic energy, graphite articles for use in the electronic field, and graphite electrodes for spectroscopic use. All of these uses require purified graphite and, of course, spectroscopic electrodes must be of extremely high purity.

In the manufacture of such graphite articles, the articles are customarily formed to the desired shapes and dimensions and are then heated to a high temperature under conditions that cause the impurities to volatilize. Typically chlorine and/or fluorine are employed during the heating step to react with the impurities for removal of the impurities by volatilization. Such processes are disclosed in the Mitchell Patent 2,315,346 and in the Brooks Patents 2,734,800 and 2,734,801, which patents are hereby incorporated into the present disclosure by reference.

In the usual manufacturing procedure, the articles are allowed to cool after the purification step and then the bare articles are carefully packaged with the intention of maintaining the high degree of purity until the time of use of the articles. Usually the bare articles are first wrapped in plastic sheet material and are then placed in containers such as plastic boxes.

It is well known that highly purified graphite articles are highly susceptible to contamination. Any contact of highly purified graphite with the hands of a workman may result in contamination of the graphite by sodium chloride and by various other impurities. It is also well known that contact of highly purified graphite with a tool results in contamination by the material of the tool. It has been further found that a plastic sheet material used to package purified graphite articles may be contaminated by parting agents, extrusion agents, lubricants and other materials employed in producing the plastic sheet. Even when the plastic sheet material is free from contamination when first manufactured, it may become contaminated by exposure and handling prior to the packaging step.

Because of the high susceptibility of purified graphite to contamination, great care is exercised in handling and packaging the graphite articles after the high temperature purification process and the handling and packaging are carried out under "white" room or box conditions, i.e., the atmosphere of the environment is kept dust free and the operators wear special apparel. All of these necessary precautions are expensive and time consuming and too often are not wholly effective. An analysis of a graphite article as soon as it is unwrapped for use may reveal the presence in appreciable amount of impurities that could not exist on the article immediately after the purifying heating step. For example aluminum, sodium, silicon, and magnesium are common contaminants that cannot survive the purifying heating step but may, nevertheless, be found on the product at the time of use.

The object of the present invention is to avoid all of these difficulties including the excessive care and the elaborate precautions against contamination in the handling and packaging of the graphite articles after the purification process.

Broadly described, this object of the invention is attained by packaging the articles before the purification step and then purifying the articles while packaged. For this purpose the articles are pre-packaged by enclosing them in permeable carbon material so that the high temperature purification step causes the impurities in the articles to be volatilized through the permeable carbon material and, in addition, brings the enclosing material up to the same degree of purity as the enclosed articles.

The permeable carbon material may be perforated material but preferably is made up of carbon fibers with numerous minute interstices. Commercially available carbon felt or carbon cloth may be employed, the latter being preferred.

In a simple practice of the invention, a number of graphite articles are wrapped in a piece of carbon cloth and the resulting bundle is tied with carbon yarn. The packages are then placed in a furnace for carrying out the high temperature purification step. After the packages cool down from the high temperature operation, they are handled with no special care and may be placed in plastic containers without any special precautions against contamination. Since the enclosing graphite cloth is as pure as the enclosed articles, friction of the cloth against the articles incidentally to subsequent handling and transportation does not result in contamination of the enclosed articles.

In the drawing, which by way of example illustrates a selected simple practice of the invention:

Figure 4:
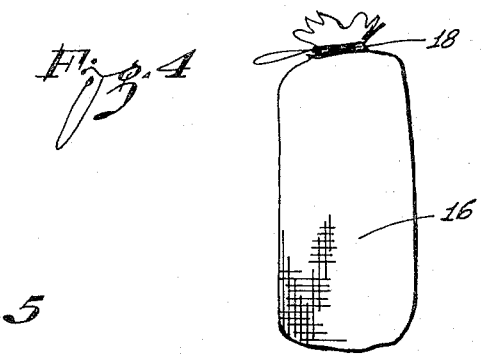
Figure 5:
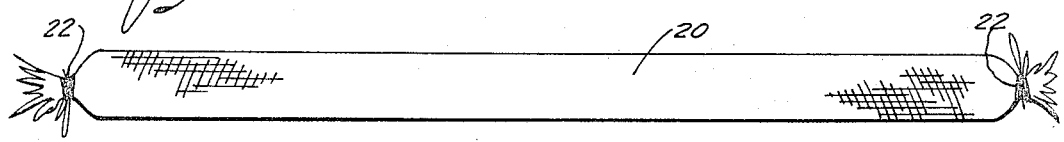

FIG. 4 is a side elevational view of another form of package in which the piece of carbon cloth forms a sack around the enclosed graphite articles with the neck of the sack tied by means of carbon yarn; and FIG. 5 is a side elevational view of an elongated package made of carbon cloth enclosing one or more greatly elongated graphite articles with the opposite ends of the package secured by carbon yarn.

Figure 1:
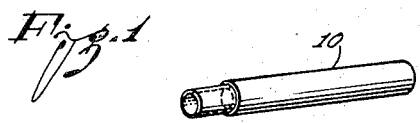
FIG. 1 is a plan view of a typical spectroscopic electrode.

The graphite article designated by numeral 10 in FIG. 1 is a spectroscopic electrode and, of course, must be of the highest purity. The impurities have not been removed from this particular electrode.

Figure 2:
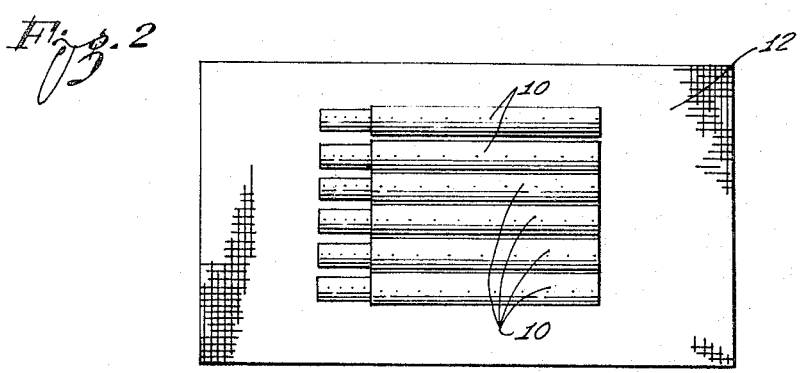
FIG. 2 is a plan view of a number of spectroscopic electrodes positioned on a piece of carbon cloth in preparation for enveloping the electrodes in the cloth.

FIG. 2 shows how a number of unpurified spectroscopic electrodes 10 may be placed on a piece of carbon cloth 12 of suitable dimensions for enclosing the electrodes. The piece of cloth 12 may be of any configuration but in this instance is of rectangular configuration. The carbon cloth is wrapped laterally around the unpurified electrodes 10 to bring the electrodes together into a bundle with the carbon cloth completely enclosing the bundle. The two ends of the carbon cloth are then constricted and tied with pieces of carbon yarn 14 to produce the package shown in FIG. 3.

FIG. 4 shows how a piece of carbon cloth of suitable shape and dimensions may be formed into a sack 16 around one or more unpurified graphite objects, the neck of the sack being constricted by a piece of carbon yarn 18.

FIG. 5 shows how one or more elongated unpurified graphite articles may be encased in a suitably dimensioned piece of carbon cloth 20 with the carbon cloth rolled to the form shown and with the two opposite ends of the carbon cloth bound by pieces of carbon yarn 22.

Figure 3:
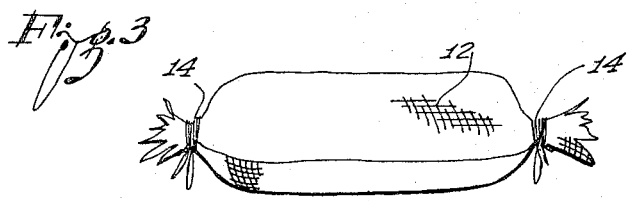
FIG. 3 is a side elevation of the package that is produced by wrapping the carbon cloth around the spectroscopic electrodes and then tying the two ends of the cloth by means of carbon yarn.

After the unpurified graphite articles are enclosed in carbon cloth to produce packages, for example packages of the form shown in FIGS. 3, 4 and 5, the packages are placed in a furnace for carrying out the usual high temperature purifying step during which the impurities in the graphite articles are volatilized in a well known manner.

The carbon cloth can withstand all of the processing to which the graphite articles are subjected. No other material can survive the purification process without contaminating the graphite. Since the carbon cloth is permeable to gases, the carbon cloth permits the penetration of the purifying gases to the enclosed graphite articles and the carbon cloth permits free exit of the volatilized impurities. The carbon fabric does not slow up or in any way hinder the purification process and it is found that the same degree of purification of the articles is attained as if the articles were not enclosed in the carbon cloth.

The carbon cloth may be contaminated when it is first wrapped around the graphite articles but the purification process effectively purifies the carbon cloth as well as the enclosed graphite articles.

After the purification process, the purified packages of purified graphite are permitted to cool and then the packages may, if desired, be placed in plastic containers. The packages may be freely handled without any special care and without the necessity of "clean" room techniques since the carbon cloth protects the enclosed purified graphite articles against contact with any extraneous material whatsoever.

My description in specific detail of a selected simple practice of the invention will suggest various changes, substitutions and other departures from my disclosure within the spirit and scope of the appended claims.

I claim:

1. in a method of producing graphite articles in purified form for transportation and handling prior to use, wherein the articles are purified by a process including a step of heating the articles to a high temperature under conditions to cause volatilization of the impurities in the articles, the improvement comprising enclosing the articles in permeable carbon material prior to said step to cause the impurities in the articles to be carried off through the permeable carbon material and to purify the permeable carbon material to provide purified enclosures for the protection of the articles up to the time of use.

2. The improvement as set forth in claim 1 in which the permeable carbon material is sheet material made of carbon filaments.

3. The improvement as set forth in claim 1 in which the permeable carbon material is a woven carbon sheet.

4. A method of purifying graphite articles in a manner to maintain the purity of the articles until the time of use, characterized by the steps of: packaging the articles in permeable carbon material for protection up to the time of use;

and thereafter subjecting the packaged articles to a high temperatures under conditions to cause volatilization of the impurities in the articles and to cause volatilization of the impurities in the permeable carbon material.

5. As a new article of manufacture, at least one carbon article of high purity and a permeable enclosure enveloping the article or articles, said enclosure being made of carbon of the same high purity as the contents of the enclosure.

6. A new article of manufacture as set forth in claim 5 in which said enclosure is made of carbon filaments.

7. A new article of manufacture as set forth in claim 5 in which said enclosure is made of a carbon fabric.

8. A new article of manufacture as set forth in claim 5 in which said enclosure is a wrapping of permeable carbon material and the wrapping is secured by carbon yarn.

No references cited.

THERON E. CONDON, *Primary Examiner.*

M. L. RICE, *Assistant Examiner.*